Nov. 8, 1932.  W. F. SILL ET AL  1,886,913

AUTOMOBILE BUMPER

Filed Feb. 24, 1930

INVENTORS
WILLIAM F. SILL.
CARL W. PIPPIN.
BY W. L. Dempsey
ATTORNEY.

Patented Nov. 8, 1932

1,886,913

UNITED STATES PATENT OFFICE

WILLIAM F. SILL, OF ST. LOUIS, AND CARL W. PIPPIN, OF PINE LAWN, MISSOURI

AUTOMOBILE BUMPER

Application filed February 24, 1930. Serial No. 430,712.

This invention relates to automobile bumpers, and more particularly to a pneumatic automobile bumper.

The object of this invention is to provide an automobile bumper that will prevent metal to metal contact when one automobile comes into contact with another.

Another object of this invention is to mitigate the force of the shock of one automobile striking another, and to prevent the transmission of said force of the shock to the chassis or working parts of the automobile.

A still further object of this invention is to provide a practical and durable pneumatic automobile bumper that can be made at relatively low cost and may be easily adapted to automobiles of various makes and types.

Other and further objects and advantages of this invention will be apparent from the specification, claims and drawing, in which:

Figure 1:
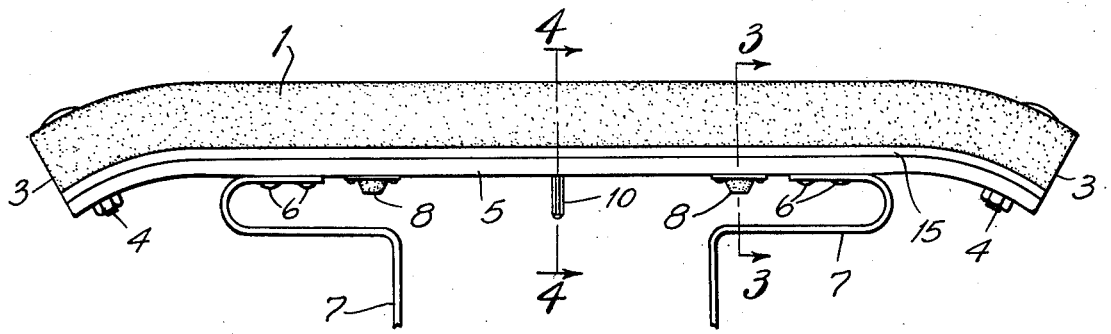
Fig. 1 is a plan view of our improved bumper viewed from above.
Figure 2:
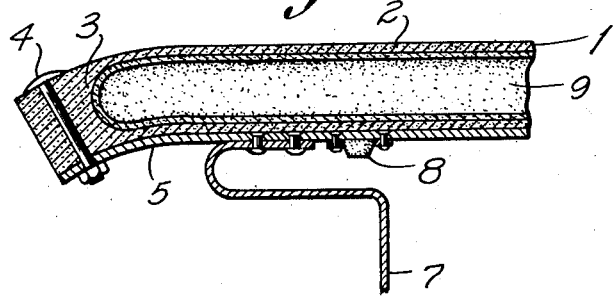
Fig. 2 is a longitudinal cross-section of one end of the bumper.

The present practice among automobile manufacturers is to provide bumpers made only of metal, some of which are resiliently supported by springs, while others are of a more solid and non-resilient construction. The objection to these classes of bumpers is that when one automobile strikes another, there is always a metal to metal contact that results in the marring of the paint, if indeed a more serious damage does not result.

The object of this invention is to make it impossible to have a metal to metal contact, hence we have provided an outer casing 1, which may be made of rubber or rubber and fabric, in the same manner that the outer casing of an automobile tire is constructed.

While we have shown the outer wall 2 of the casing 1 to be of uniform thickness, we wish it distinctly understood that the forward outer wall may be provided with greater thickness; in other words, a tread may be provided as in the case of the automobile tire casing.

The ends 3 of the casing 1 are preferably made of solid rubber to form a more secure fastening for the bolts 4 which hold the casing firmly attached to a metal back 5, which in turn is riveted at 6 to a spring 7, which is bolted to the sideframe of the automobile chassis.

To further increase the resiliency of the bumper, a solid piece of rubber may be inserted, as shown at 8, between the metal back 5 and the springs 7.

An inner tube 9 is provided, made air and water tight, and is adapted to be inserted in the outer casing 1 in much the same manner as an inner tube is inserted in the outer casing of an automobile tire. An inwardly opening air valve 10 is provided with a hollow stem 11 which protrudes through the opening 12 in the metal backing 5, thereby permitting the inflation of the inner tube 9.

Figure 3:
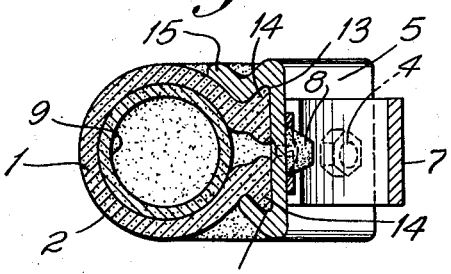
Fig. 3 is a cross-section along the line 3—3 in Fig. 1.
Figure 4:
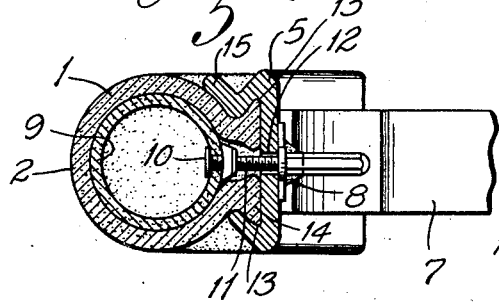
Fig. 4 is a cross-section along the line 4—4 in Fig. 1.
Figure 5:
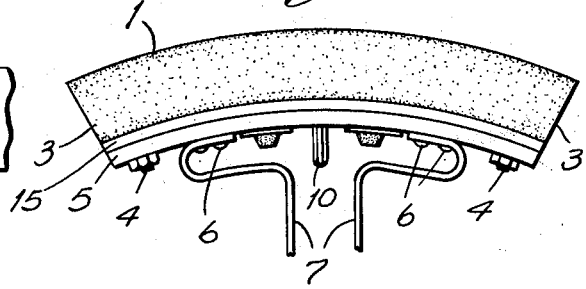
Fig. 5 is a plan view, viewed from the top, of a bumperette, or small bumper, to be attached to the rear end of an automobile.

The metal backing 5, best shown in cross-section in Figs. 3 and 4, is curvilinear to provide longitudinal grooves 13 which hold the bead 14 of the outer casing 1 when the inner tube 9 is inflated. The curvilinear portion 15 of the upper edge of the metal backing 5 is of greater length than the curvilinear portion of the lower edge and protrudes outwardly a sufficient distance to give an ornamental effect when highly polished or plated.

It is readily obvious that by the use of a pneumatic cushion between the metal backing supported on resilient springs and an automobile with which the bumper may come in contact, not only will the shock to each of the automobiles be greatly reduced, but the chances of scarring the paint or bending the fenders will be greatly reduced if not entirely eliminated. It is, also, quite obvious that the contour of the bumper can be varied at will; that the outer casing may be provided with a smooth external surface, or will lend itself readily to a great variety of ornamentations in the nature of a tread, and in either case it would be equally effective in preventing scars and injury to a car with which it came into contact.

We, therefore, wish it distinctly understood that we do not confine ourselves to the identical form and structure shown in the drawing, but that our invention is intended to be broadly interpreted as including any equivalent method of interposing a pneumatic cushion or shock absorber between two automobiles or an automobile and any other object with which it might contact. The mobility of air under pressure is well known, and when the air is enclosed in an elastic body, its mobility is utilized to the maximum.

Having fully described our invention, what we claim as new and useful and desire to protect by Letters Patent is:—

1. A pneumatic bumper of the class described, comprising a curvilinear metal backing, a resilient hollow casing closed at each end by a resilient solid rubber integral with said casing, means for holding said resilient solid rubber to said metal backing, means for attaching said metal backing to the chassis of an automobile both fore and aft.

2. A pneumatic bumper of the class described, consisting of an outer casing hollow throughout the greater portion of its length and solid in cross-section at each end, said hollow portion being slotted from end to end, the marginal edges of said slotted portion being thicker than the side walls of said casing and formed into a bead adapted to fit into and be held in grooves of like contour in a metal backing, a metal backing curvilinear in cross-section adapted to fit and hold said outer casing.

In witness whereof we have hereunto affixed our signatures this 11th day of February, 1930.

WILLIAM F. SILL.
CARL W. PIPPIN.